US011188510B2

(12) United States Patent
Bonnell

(10) Patent No.: US 11,188,510 B2
(45) Date of Patent: Nov. 30, 2021

(54) ANALYTICAL PLATFORM FOR DISTRIBUTED DATA

(71) Applicant: PagerDuty, Inc., San Francisco, CA (US)

(72) Inventor: Christopher Phillip Bonnell, Longmont, CO (US)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 16/777,708

(22) Filed: Jan. 30, 2020

(65) Prior Publication Data

US 2021/0240686 A1    Aug. 5, 2021

(51) Int. Cl.
| | | |
|---|---|---|
| *G06F 16/30* | (2019.01) | |
| *G06F 16/22* | (2019.01) | |
| *G06F 9/30* | (2018.01) | |
| *G06F 16/182* | (2019.01) | |
| *G06F 16/242* | (2019.01) | |

(52) U.S. Cl.
CPC ...... *G06F 16/2246* (2019.01); *G06F 9/30014* (2013.01); *G06F 16/1824* (2019.01); *G06F 16/242* (2019.01)

(58) Field of Classification Search
CPC .............. G06F 16/2246; G06F 16/242; G06F 16/1824; G06F 9/30014
See application file for complete search history.

(56) References Cited

U.S. PATENT DOCUMENTS

| | | | | |
|---|---|---|---|---|
| 5,944,774 A * | 8/1999 | Dent | ......................... | G06F 7/49 |
| | | | | 708/517 |
| 6,549,910 B1 * | 4/2003 | Tate | .................... | G06F 16/2462 |
| 7,769,781 B1 * | 8/2010 | Huntley | .................. | G06F 16/22 |
| | | | | 707/791 |
| 8,024,458 B1 * | 9/2011 | Buragohain | ........ | G06F 11/3495 |
| | | | | 709/224 |
| 8,316,059 B1 * | 11/2012 | Schiffmann | ......... | G06F 16/2246 |
| | | | | 707/797 |
| 8,458,547 B2 * | 6/2013 | Viswanathan | ........ | H03M 13/01 |
| | | | | 714/746 |
| 8,745,109 B2 * | 6/2014 | Zhang | ....................... | G06F 7/22 |
| | | | | 708/200 |

(Continued)

OTHER PUBLICATIONS

Lau, Manfred & Kuffner, James. (2010). Scalable Precomputed Search Trees. 6459. 70-81. 10.1007/978-3-642-16958-8_8. (Year: 2010).*

(Continued)

*Primary Examiner* — Brittany N Allen
(74) *Attorney, Agent, or Firm* — Young Basile Hanlon & MacFarlane, P.C.

(57) ABSTRACT

Data objects are sampled from data sources and stored in a tree data structure that is employed to compute histogram information. Each node in the tree includes sufficient statistics and a particular value corresponding to one or more sampled data objects. The nodes of the tree can be two or more types, such as exponential nodes and regular nodes. Also, each histogram tree may be precalculated to start with an empty exponential node, and a defined number of regular nested nodes that correlate to a precision value for the histogram, i.e., a number of significant figures for sampled data values that can be stored in the tree.

20 Claims, 7 Drawing Sheets

(56) References Cited

U.S. PATENT DOCUMENTS

| | | | | |
|---|---|---|---|---|
| 8,959,130 | B2* | 2/2015 | Wegener | H03M 7/30 |
| | | | | 708/203 |
| 9,047,118 | B2* | 6/2015 | Wegener | H03M 7/30 |
| 9,218,382 | B1* | 12/2015 | Muntes | G06F 11/3476 |
| 9,361,339 | B2* | 6/2016 | DeHaan | G06F 16/24545 |
| 9,953,058 | B1* | 4/2018 | Sadri | G06F 16/2246 |
| 2002/0198896 | A1* | 12/2002 | Chaudhuri | G06F 16/24542 |
| 2004/0024801 | A1* | 2/2004 | Hamilton | G06F 17/18 |
| | | | | 708/490 |
| 2004/0193629 | A1* | 9/2004 | Mozes | G06F 16/2462 |
| 2010/0153328 | A1* | 6/2010 | Cormode | G06N 5/04 |
| | | | | 706/52 |
| 2016/0350396 | A1* | 12/2016 | Blanc | G06F 16/27 |
| 2017/0270146 | A1* | 9/2017 | Harrison | G06F 7/14 |
| 2019/0303421 | A1 | 10/2019 | Bonnell | |

OTHER PUBLICATIONS

Singh et al., Implementation and Performance Analysis of Exponential Tree Sorting, International Journal of Computer Applications (0975-8887) vol. 24—No. 3, Jun. 2011 (Year: 2011).*

Tene, HDRHistogram, retrieved by Wayback machine on Sep. 27, 2018 (Year: 2018).*

Heitor Murilo Gomes, Jesse Read, Albert Bifet, Jean Paul Barddal, and João Gama. 2019. Machine learning for streaming data: state of the art, challenges, and opportunities. SIGKDD Explor. Newsl. 21 ,2 (Dec. 2019), 6-22. DOI:https://doi.org/10.1145/3373464.3373470 (Year: 2019).*

A. Denisova and V. Sergeyev, "Using hierarchical histogram representation for the EM clustering algorithm enhancement," Proceedings of the 10th International Symposium on Image and Signal Processing and Analysis, 2017, pp. 41-46 (Year: 2017).*

* cited by examiner

US 11,188,510 B2

ANALYTICAL PLATFORM FOR DISTRIBUTED DATA

TECHNICAL FIELD

The present invention relates generally to the field of data processing, and more particularly, but not exclusively to, database and file management or data structures.

BACKGROUND

Obtaining exact answers to basic queries on streaming data and/or massive datasets (e.g., petabytes and larger) consumes large amounts of compute resources. In addition, a query on a massive dataset ("Big Data") can require an amount of time that becomes unacceptable for analysis.

Stochastic stream algorithms have been developed to address the challenges of querying streaming data and/or massive datasets for cases in which approximate answers are acceptable for visualizations, metrics and statistics. These algorithms process a massive dataset in a single pass, and compute small summaries of the dataset. A histogram uses collected data, such as small summaries, to create metrics, statistics, visualizations and other analytical information for massive datasets.

Typically, High Dynamic Range (HDR) histogram based algorithms have been used to record and analyze sampled data value counts of streaming data and/or massive datasets in latency and performance sensitive applications. The HDR histogram can be used across a configurable integer value range with configurable value precision within the range of values stored in an array. Value precision may be expressed as the number of significant digits in the recorded value, and provides control over value quantization behavior across the value range and the subsequent value resolution at any given level. Although the HDR Histogram is designed for recoding histograms of value measurements, large amounts of streaming data and/or massive datasets stored in arrays can become difficult for the HDR histogram to evaluate in real time.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE INVENTION

Figure 1:
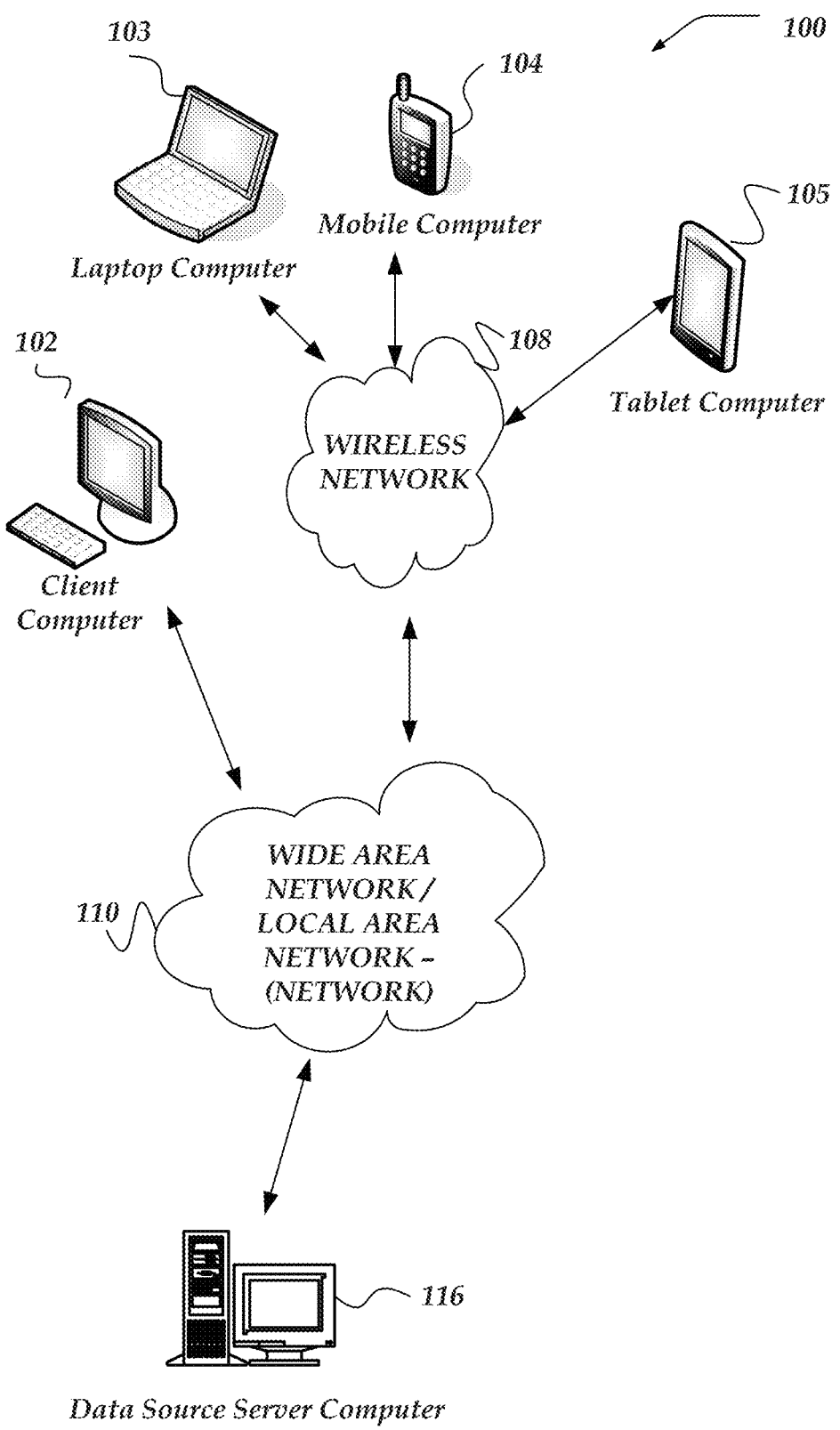
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data object" refers to one or more data structures that comprise data models. In some cases, data objects may be considered portions of the data model. Data objects may represent individual instances of items or classes or kinds of items.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

As used herein the term "histogram" refers to a data structure used to track the distribution of a plurality of values for a variable. A variety of implementations are available for a histogram data structure and can include program code or instructions to control access of the histogram data structure. A histogram provides a representation of the distribution of numerical data by providing an estimate of the probability distribution of a continuous variable. To construct a histogram, the first step is to "bin" (or "bucket") the range of values—that is, divide the entire range of values into a series of intervals—and then count how many values fall into each interval. The bins are usually specified as consecutive, non-overlapping intervals of a variable. The bins (intervals) are adjacent, and are often (but not required to be) of equal size. The number of bins may be static or dynamic based upon the variable being tracked. One or more embodiments of histograms may use HDR histograms or sparse version thereof. A histogram may be employed to compute metrics for data values included in the bins.

If the bins are of equal size, a rectangle is erected over the bin with height proportional to the frequency—the number of cases in each bin. A histogram may also be normalized to display "relative" frequencies. It then shows the proportion of cases that fall into each of several categories, with the sum of the heights equaling one. Additionally, a histogram may be embodied in a graphical display that represents the distribution of sampled data. A histogram is commonly made from a table such as an array with a plurality of categories, which can inform a count of the sample data in each category.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to data processing using one or more processors that execute one or more instructions to perform as described herein. In one or more of the various embodiments, sampled data objects are stored in a tree data structure that is employed to compute histogram information. Each node in the tree includes sufficient statistics and a particular value corresponding to one or more sampled data objects. The nodes of the tree can be two or more types, such as exponential nodes and regular nodes. Also, each histogram tree may be precalculated to start with an empty exponential node, and a defined number of regular nested nodes that correlate to a precision value for the histogram, i.e., a number of significant figures for sampled data values that can be stored in the tree.

Additionally, when the histogram tree is not empty and a new data object is inserted into the tree that corresponds to one or more nodes that already populated, the sufficient statistics and values at such a node are added together, component-wise, and any unique data values not present in populated nodes are new nodes necessary to represent the newly inserted data object are created.

Furthermore, to merge two populated histogram trees together, if a branch is unique between the two trees, it appears in the result, if there's an overlap, each overlapping node is represented in the output by a node with the same value, but the sum is based on the relevant counts. Using a tree data structure, all of the sufficient statistics can be computed for a histogram in almost a logarithmically (ten times) faster amount of time than a traditional computation of histogram statistics based on data objects stored in an array. It is noteworthy that a size of a tree data structure storing sampled data objects for computation of a histogram is typically a small fraction of another size for a typical array typically used to store raw data objects to compute a histogram.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, data source server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as data source server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, data source server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of data source server computer 116 is described in more detail below in conjunction with FIG. 3. Although FIG. 1 illustrates data source server computer 116, or the like, as a single computer, the innovations or embodiments are not so limited. For example, one or more functions of data source server computer 116, or the like, may be distributed across one or more distinct network computers. Moreover, in one or more embodiments, data source server computer 116 may be implemented using a plurality of network computers. Further, in one or more of the various embodiments, data source server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
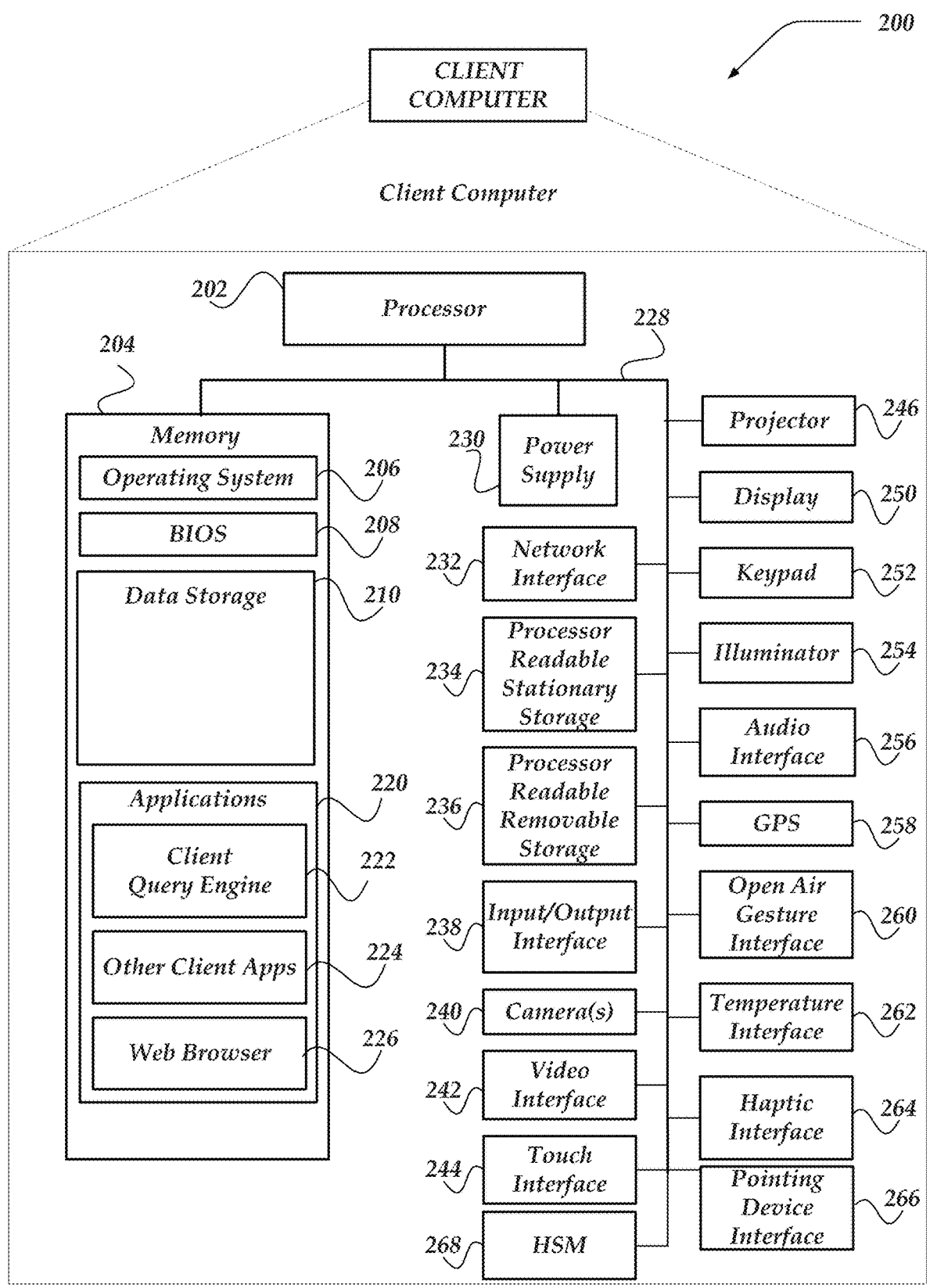
FIG. 2 shows a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, client query engine 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client query engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
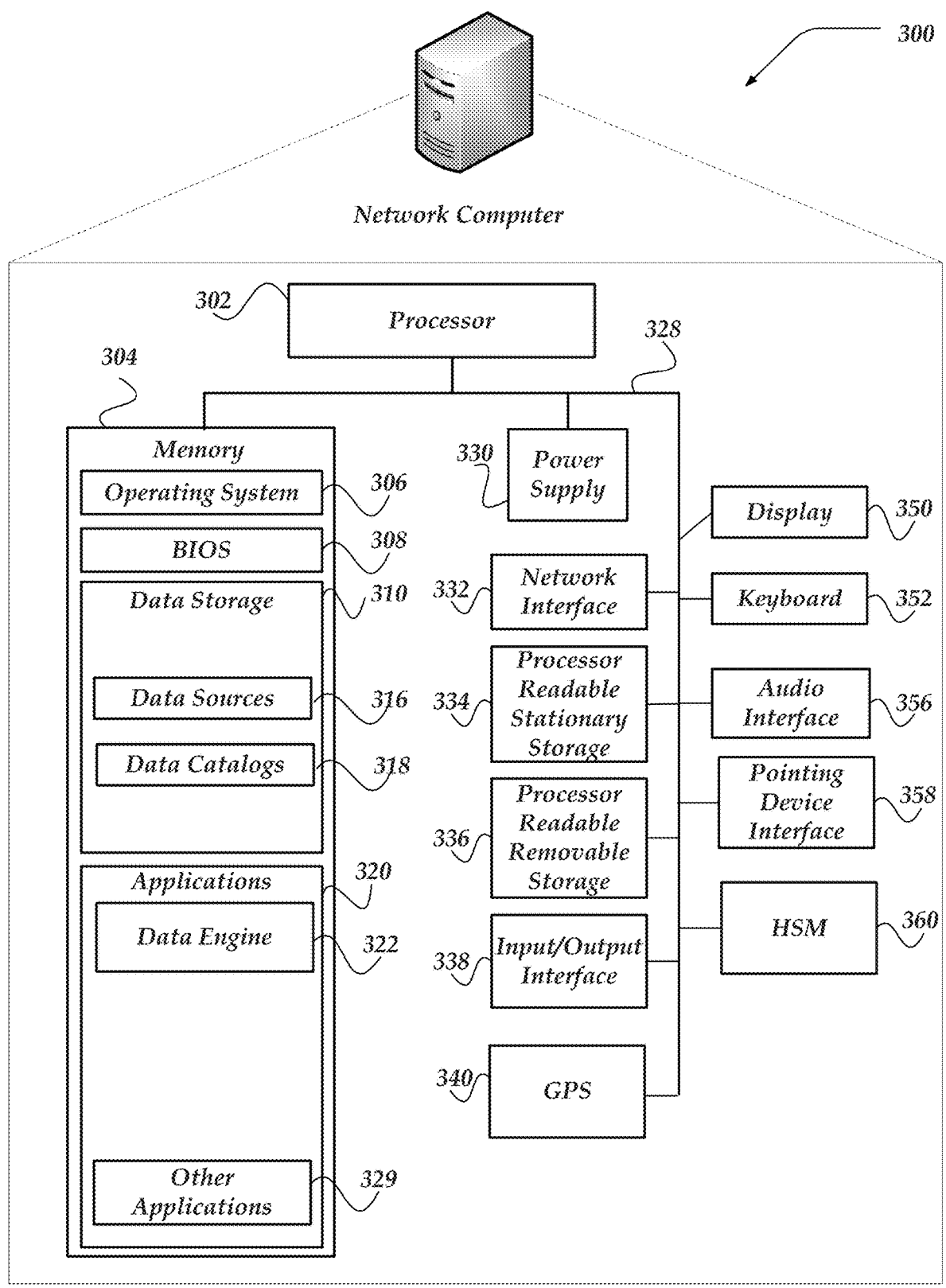
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of data source server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, assessment engine 322, visualization engine 324, modeling engine 326, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, data sources 316, data catalogs 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include data engine 322, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, data engine 322, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to data engine 322, other applications 329, or the like, may be provisioned and de-commissioned automatically.

Also, in one or more of the various embodiments, data engine 322, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
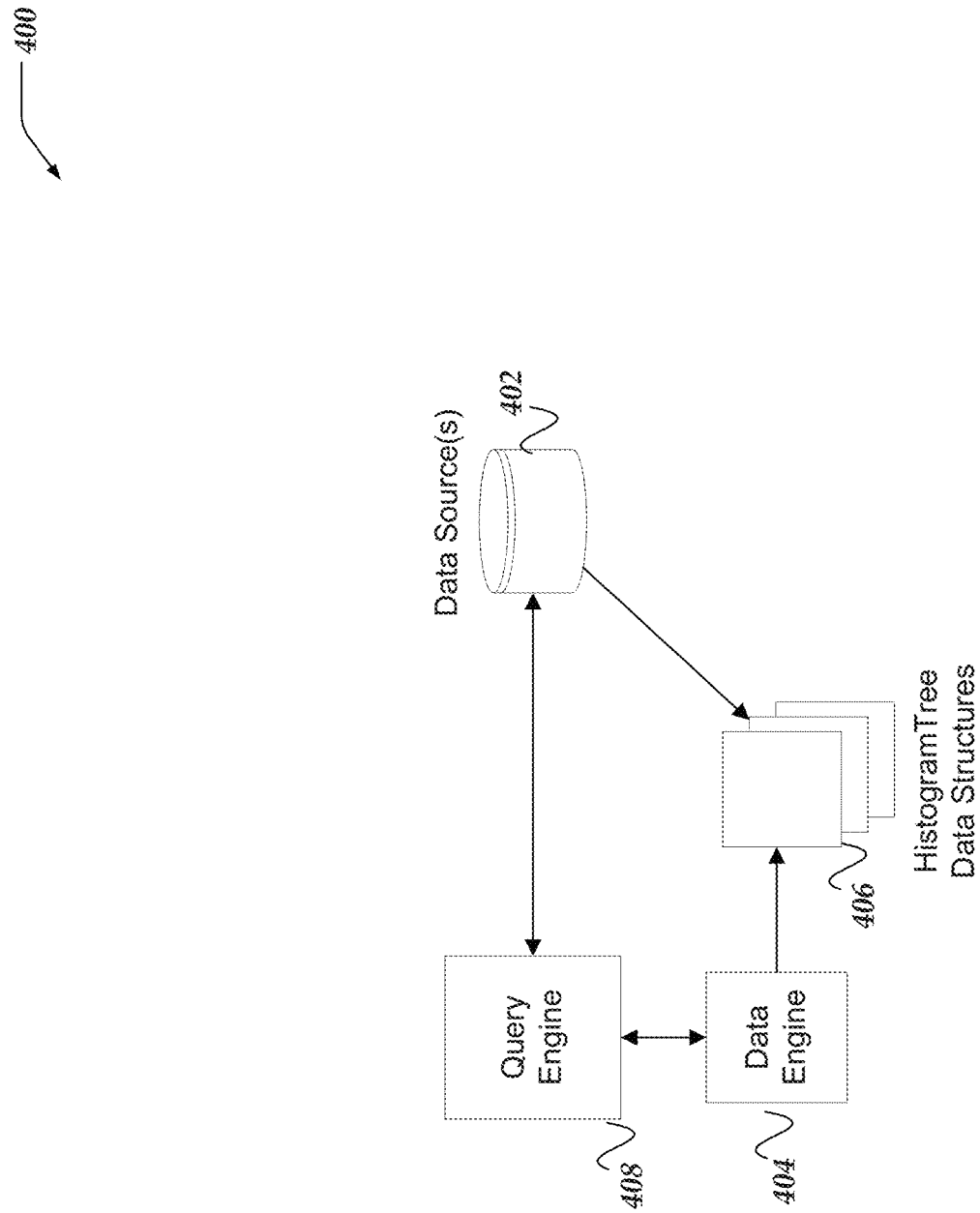
FIG. 4 shows a logical architecture of a system for using a tree data structure for histogram based query applications.

FIG. 4 illustrates a logical architecture of system 400 for applications that employ histograms to generate statistics, metrics and visualizations for sampled data from data streams and/or massive datasets. In one or more of the various embodiments, system 400 may be arranged to include one or more data sources, such as, data source 402, one or more data engines, such as, data engine 404, one or more histogram tree data structures, such as, histogram tree data structure 406, one or more query engines, such as query engine 408, or the like.

In one or more of the various embodiments, data source 402 may be arranged to store one or more data objects. In one or more of the various embodiments, data source 402 may be a database, file system, repository, document management system, or the like.

In one or more of the various embodiments, data engine 404 may be arranged to generate one or more histogram tree data structures 406 that store sampled data objects from data source 402. Accordingly, in one or more of the various embodiments, data engine 404 may be arranged to sample data objects that are provided by as results to queries by query engine 408. The sampled data objects may be employed to generate one or more entries and sufficient statistics at nodes of histogram tree data structures 406.

In one or more of the various embodiments, data engine 404 may be arranged to selectively generate one or more histogram tree data structures 406 that include the sampled data objects. In some embodiments, data engine 404 may be arranged to initially generate one or more unpopulated histogram tree data structures 406 off-line or otherwise in preparation for subsequent query activity. Also, in one or more of the various embodiments, data engine 404 may be arranged to generate one or more histogram tree data structures 406 on-the-fly as they may be needed for responding to queries of sampled data objects.

In one or more of the various embodiments, nodes of histogram tree data structures 406 may be arranged by a precision, i.e., the significant figures, stored for a value of a data object along with sufficient statistics at corresponding nodes of the histogram tree data structures 406. In one or more of the various embodiments, data engine 404 may be arranged to generate sufficient statistics at each node, such as a number of data values inserted at a node, a count of data values inserted at the node, and a sum of data values inserted at the node.

In one or more of the various embodiments, query engine 408 may be arranged to answer data source queries, or the like. In some embodiments, query engine 408 may be considered to be part of a larger database engine or query planner designed for processing database table joins, another service or applications, or the like. Also, in one or more of the various embodiments, query engine 408 may be arranged to provide query information that includes identity information for one or more sampled data objects. Further, in one or more of the various embodiments, query engine 408 may be enabled to employ data engine 404 and histogram tree data structures 406 to determine whether to include one or more sampled data objects in a result set (or query plan) rather than having to scan the data source directly.

Note, while database operations and network firewalls are presented herein as use cases, one of ordinary skill in the art will appreciate that set membership testing may be advantageous to many applications or problem domains. Accordingly, for brevity and clarity, the disclosure of these innovations will focus on histogram tree data structures rather than the larger systems that may benefit from improved performance due to the histogram tree data structures described herein.

Figure 5A:
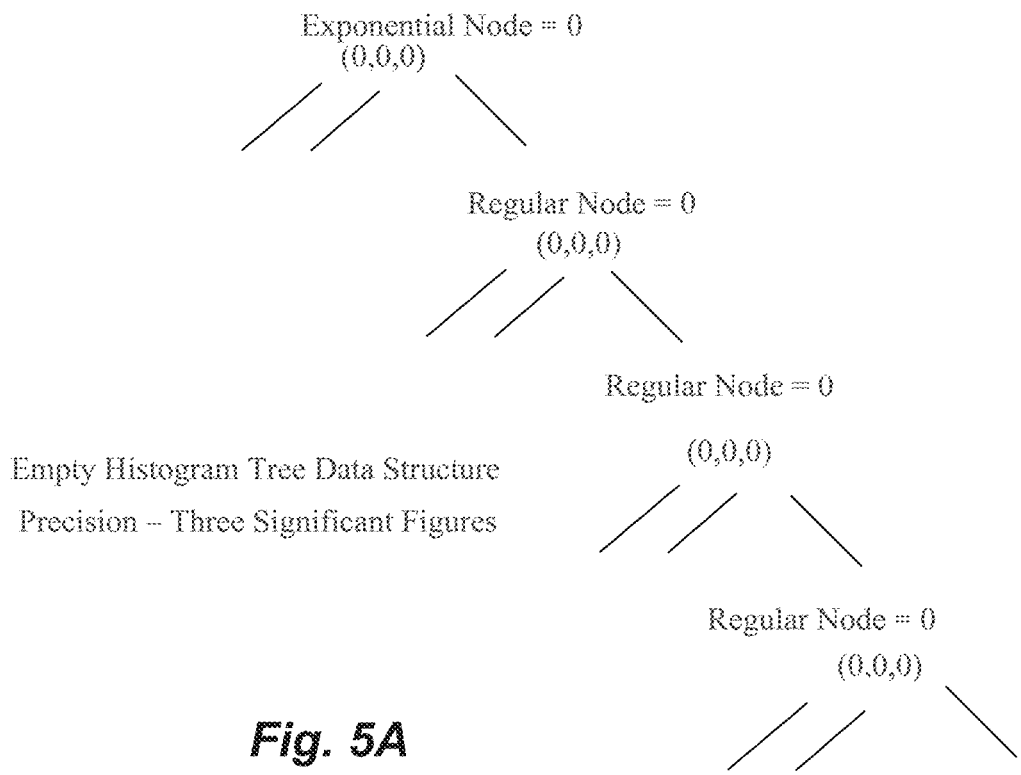
FIGS. 5A-5C illustrates a logical architecture for a histogram tree.

FIG. 5A illustrates an exemplary histogram tree data structure that is initially created with empty nodes but does provide for a precision, i.e., number of significant figures, for sampled data objects that may be stored in the nodes of the tree.

Figure 5B:
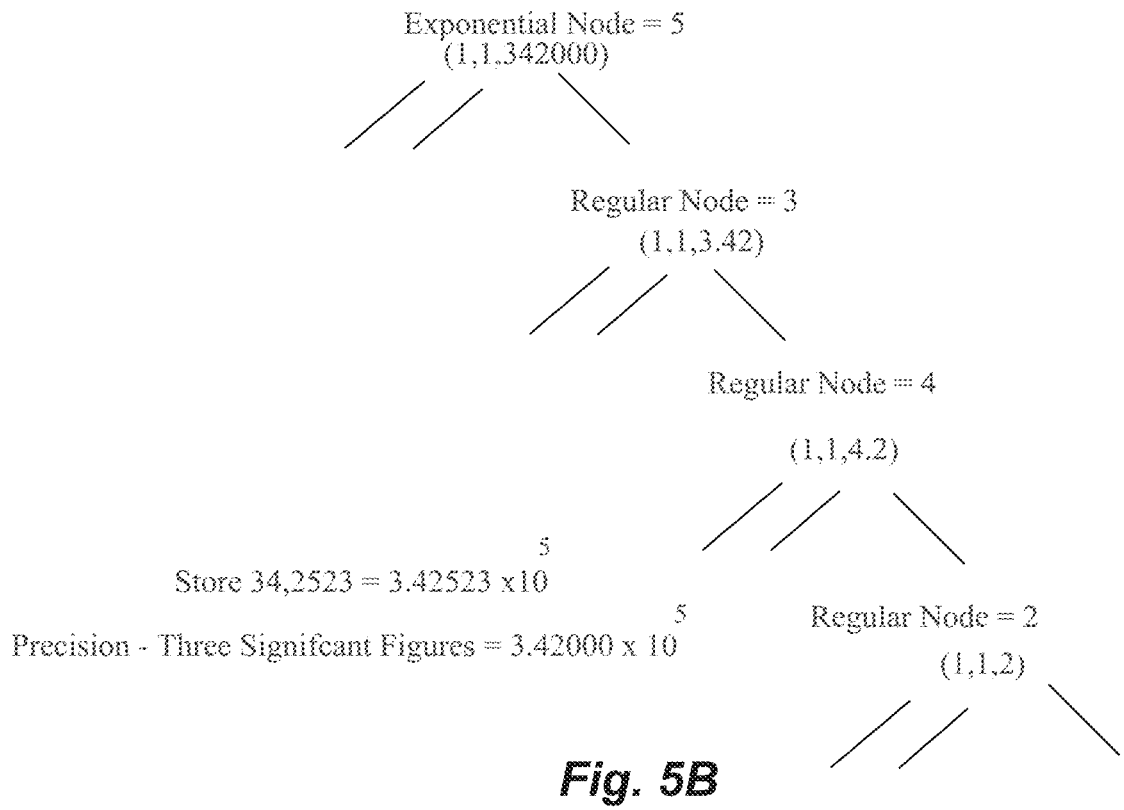

FIG. 5B shows a histogram tree data structure that is populated with values from a data object at a precision of three significant figures even though the raw data object includes live significant figures, i.e., 34,2523, which is truncated by the precision of the tree to 34,2000. Also, the three significant figures of precision for the data object is mathematically represented by $3.42*10^5$. As shown, the exponent of the truncated data value is 5, which is inserted into a root level exponential node of the histogram tree. As for the three significant figures of 3.42, at a first regular node, the value of 3 is inserted. Next, at a second regular node, the value of 4 is inserted which is beneath the first regular node. Further, at a third regular node, the value of 2 is inserted which is beneath the second regular node.

Also, sufficient statistics are computed at each populated node of the histogram tree data structure corresponding to one or more of a number of data values inserted at a populated node, a count of data values inserted at the node, and a sum of data values inserted at the node. In this way, the exponential node includes the statistic of (1,1,342000), the first regular node includes the statistic of (1,1,3.42), the second regular node includes the statistic of (1,1,4.2), and the third regular node includes the statistic of (1,1,2). The histogram algorithm is employed to compute the statistics and other metrics for data values that can be included at the nodes in the histogram tree data structure for improved performance in providing histogram generated statistics and/or metrics.

Figure 5C:
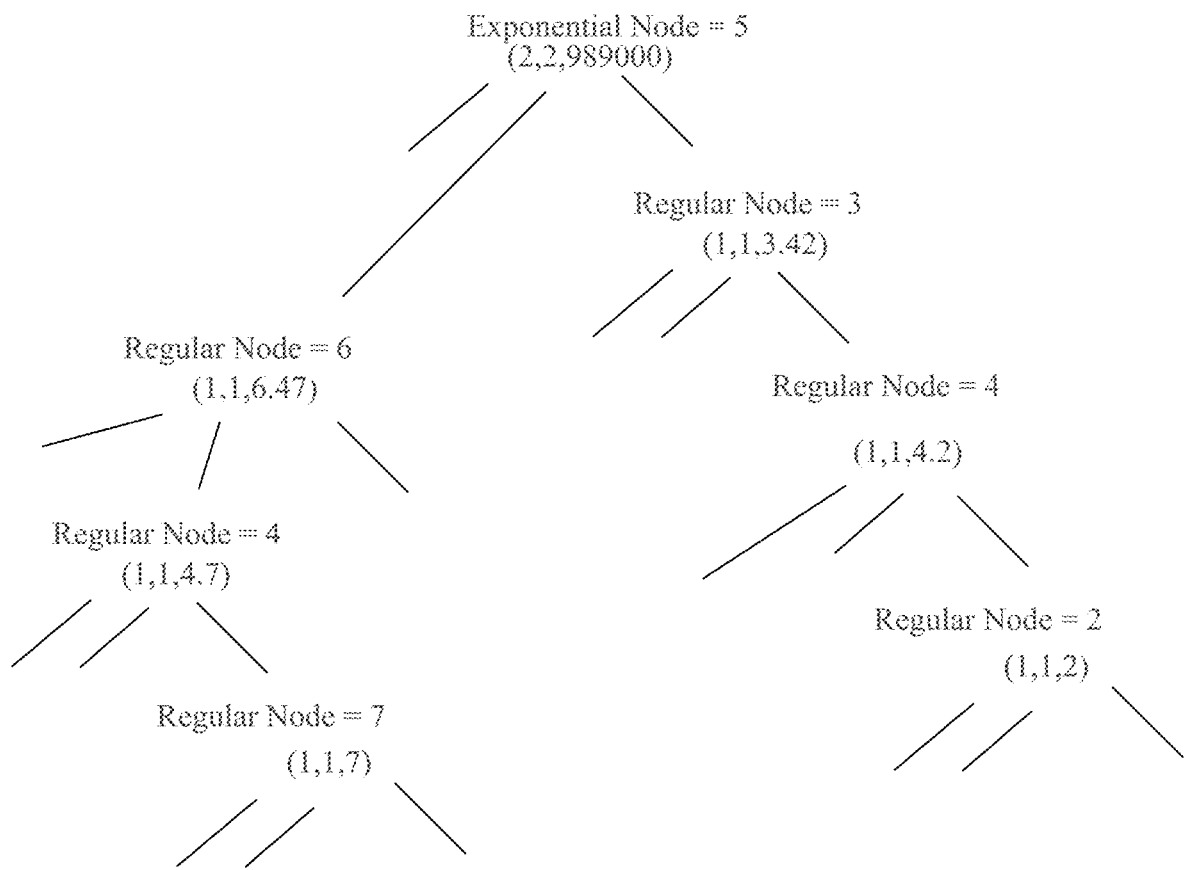

FIG. 5C illustrates the histogram tree data structure of FIG. 5B, but another sampled data value of 64,7999 is added to the tree. 64,799 is truncated by the tree significant figures precision of the tree to 64,7000. Also, the three significant figures of precision for the data object is mathematically represented by $6.47*10^5$. As shown, the exponent of the truncated data value is 5, which is added to the root level exponential node of the histogram tree. The sufficient statistics at the exponential node are increased by one.

As for the three significant figures of 6,47, a new first regular node is added where the value of 6 is inserted, which is a branch below the exponential node that includes 5. Next, a new second regular node is added where the value of 4 inserted, which is a branch below the new first regular node that includes 6. Also, a new third regular node is added where the value of 7 is inserted, which is positioned as a branch beneath the second previously populated regular node that includes 4. Further, sufficient statistics are computed for the histogram at the new first, second and third nodes. In this way, sampled data objects may be quickly inserted into the array and histogram information and sufficient statistics may be efficiently precomputed for each populated node in the histogram tree data structure.

Although sufficient statistics are mentioned herein, the invention is not limited to just computing this information. In one or more embodiments, additional histogram information may be computed at each node that is created or added to within the histogram tree data structure. Furthermore, histogram tree data structures may be merged in substantially the same way as adding one new data object to the tree data structure as discussed above.

Generalized Operations

Figure 6:
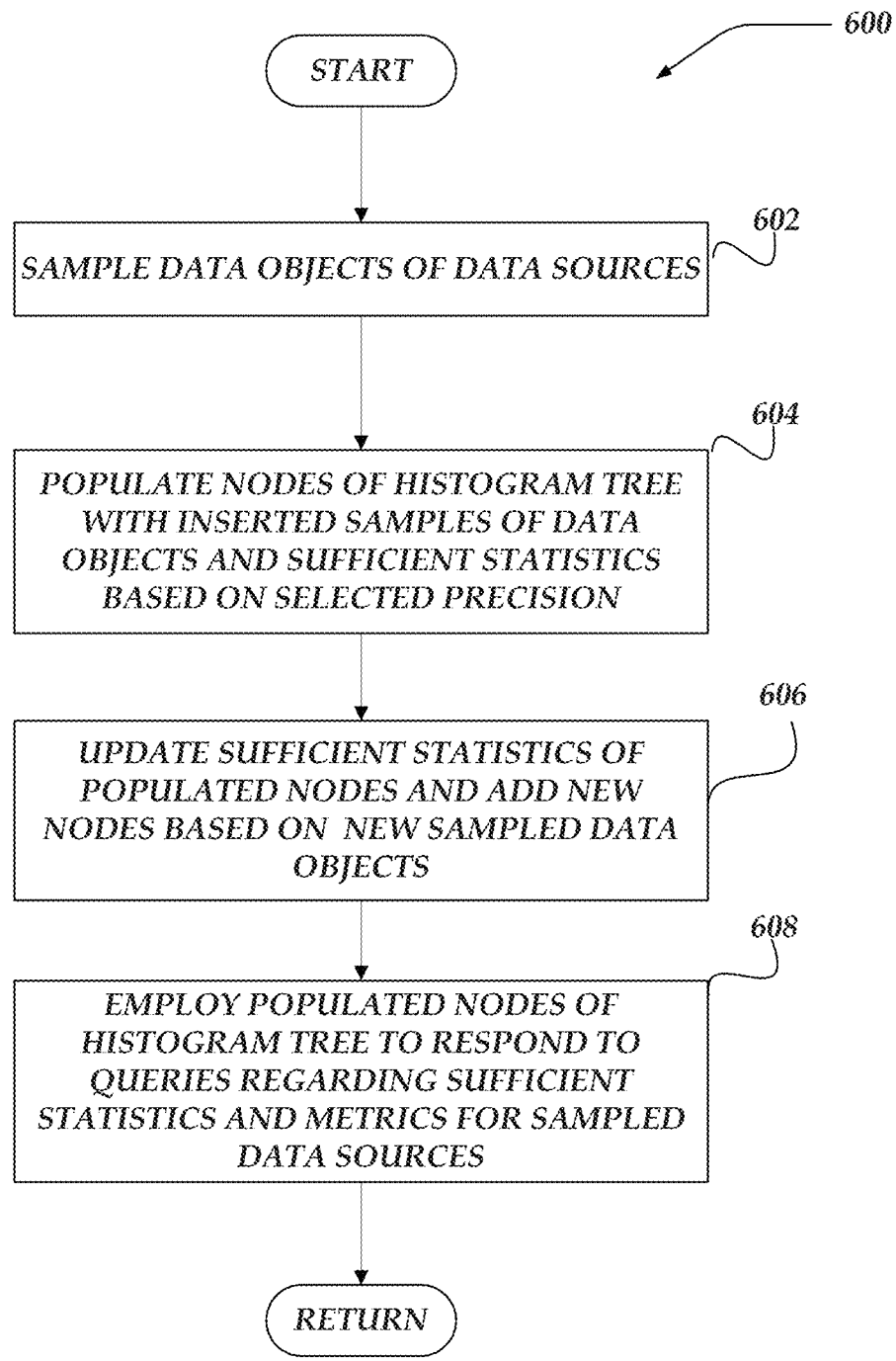
FIG. 6 shows a flow chart of logical operations to populate and query a histogram tree in accordance with the various embodiments of the present invention.

FIG. 6 illustrates an exemplary flow diagram that generates a histogram tree data structure populated with sampled data objects. Moving from a start block, the process advances to block 602 where data objects are sampled at intervals from one or more data sources such as data streams or data stores. In one or more embodiments, the intervals may be static, dynamic, and/or variable, e.g., vary based on a count of sampled data objects.

At block 604, the nodes of the histogram tree data structure are populated with inserted values from sampled data objects. At each populated node, sufficient statistics and/or other information is computed based on at least a selected precision for the tree, i.e., number of significant figures to be stored for the sampled data objects.

Stepping to block 606, new sampled data objects may be added to the histogram tree data structure. New nodes are created and updated with their corresponding values and at least computed sufficient statistics for each new node and updates provided to related nodes above the new nodes in the histogram tree data structure.

Moving to block 608, the information stored at the populated nodes of the histogram tree data structure are employed to respond to queries regarding sufficient statistics, metrics and other histogram information. Next, the process returns to performing other actions.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for data processing using one or more network computers, comprising:
    creating a histogram tree data structure including a root level exponential node and a defined number of regular nested nodes, wherein the defined number is correlated with a precision at which sampled values can be stored in the histogram tree data structure, wherein the root level exponential node and regular nested nodes are created as empty nodes;
    sampling a plurality of data objects from one or more data sources to produce a plurality of sample values;
    truncating at least one of the plurality of sample values to match the precision to produce a truncated sample value;
    populating the histogram tree data structure with the truncated sample value by storing an exponent of the truncated sample value in the root level exponential node and respective significant figure digits of the truncated sample value in respective ones of the regular nested nodes;
    computing information for each populated node in the histogram tree data structure, wherein the computed information includes one or more of statistics, metrics, or histogram information that are stored in respective populated nodes;
    employing one or more of the computed information at populated nodes of the histogram tree data structure to respond to a query; and
    employing the histogram information to provide a visualization representing an estimate of probability distribution for numerical data of at least one of the plurality of sampled data objects.

2. The method of claim 1, further comprising:
adding a new sample value for a new data object to the histogram tree data structure, including:
    sampling a new data object from the one or more data sources to produce at least the new sample value;
    updating the computed information for one or more previously populated nodes in the histogram tree data structure that correspond to at least one significant figure digit of the new sample value based on the precision; and
    generating one or more new nodes in the histogram tree data structure for one or more significant figure digits of the new sample value that are non-represented in the one or more previously populated nodes based on the precision, wherein computed information is computed for each new node in the histogram tree data structure.

3. The method of claim 1, further comprising:
generating a new histogram tree data structure based on merging the tree data structure with another histogram tree data structure that also stores sample values produced by sampling data objects from the one or more data sources, including:
    creating a new precision for the new histogram tree data structure based on a greater of the precision of the histogram tree data structure and another precision of the other histogram tree data structure;
    adding equivalent prepopulated nodes from the histogram tree data structure and the other histogram tree data structure together, wherein computed information for the added together nodes is updated based on the new precision; and
    adding non-equivalent prepopulated nodes to the new histogram tree data structure in a hierarchical arrangement based on the new precision.

4. The method of claim 1, further comprising:
generating the histogram tree data structure with zero values at each node based on the precision prior to sampling the data objects from the one or more data sources.

5. The method of claim 1, wherein the one or more data sources, further comprise one or more of databases, applications, services, file systems, spreadsheets, document management systems, local data streams, or remote data streams.

6. A processor readable non-transitory storage media that includes instructions for data processing, wherein execution of the instructions by one or more processors causes actions to be performed, comprising:
    sampling a plurality of data objects from one or more data sources;
    providing a precision for a number of significant figures for a histogram tree data structure usable to store information regarding the sampled data objects;
    in response to one or more of the sampled data objects having their number of significant figures greater than the provided precision, truncating the significant figures for the one or more of the sampled data objects to match the provided precision;
    employing the histogram tree data structure to store a value for each sampled data object including storing an exponent in an exponential node, wherein a number of hierarchical levels for nodes in the tree data structure are arranged according to the provided precision, and wherein the histogram tree data structure is initialized to start with the exponential node being empty, and a defined number of regular nested nodes that are empty and correlate to the provided precision;

computing information for each populated node in the histogram tree data structure, wherein the computed information includes one or more of statistics, metrics, or histogram information relating to the sampled data objects;

employing one or more of the computed information at populated nodes of the histogram tree data structure to respond to a query related to the data sources; and employing the histogram information to provide a visualization representing an estimate of probability distribution for numerical data of the one or more sampled data objects.

7. The processor readable non-transitory storage media of claim 6, further comprising instructions that when executed causes further actions to be performed, comprising:

adding a new data object to the histogram tree data structure, including:
sampling a new data object from the one or more data sources;
updating the computed information for one or more previously populated nodes in the histogram tree data structure that correspond to one or more values of the sampled new data object based on the provided precision; and
generating one or more new nodes in the histogram tree data structure for one or more new values of the sampled new data object that are non-represented in the one or more previously populated nodes based on the provided precision, wherein computed information is provided for each new node in the histogram tree data structure.

8. The processor readable non-transitory storage media of claim 6, further comprising instructions that when executed causes further actions to be performed, comprising:

generating a new histogram tree data structure based on merging the histogram tree data structure with another histogram tree data structure that also stores sample values produced by sampling the one or more data sources, including:
creating a new precision for the new histogram tree data structure based on a greater of the precision of the histogram tree data structure and another precision of the other histogram tree data structure;
adding equivalent prepopulated nodes from the histogram tree data structure and the other histogram tree data structure together, wherein computed information for the added together nodes is updated based on the new precision; and
adding non-equivalent prepopulated nodes to the new histogram tree data structure in a hierarchical arrangement based on the new precision.

9. The processor readable non-transitory storage media of claim 6, further comprising instructions that when executed causes further actions to be performed, comprising:

generating the histogram tree data structure with zero values at each node based on the precision prior to sampling the data objects from the one or more data sources.

10. The processor readable non-transitory storage media of claim 6, wherein the one or more data sources, further comprise one or more of databases, applications, services, file systems, spreadsheets, document management systems, local data streams, or remote data streams.

11. A system for data processing over a network:
a network computer, comprising:
a transceiver that communicates over the network;
a memory that stores at least instructions; and
one or more processors that execute instructions that perform actions, including:
sampling a plurality of data objects from one or more data sources;
providing a precision for a number of significant figures for each value to be stored for each sampled data object;
in response to one or more of the sampled data objects having their number of significant figures greater than the provided precision, truncating the significant figures for the one or more data objects to match the provided precision;
employing a histogram tree data structure to store the value for each sampled data object, wherein a number of hierarchical levels for nodes in the tree data structure are arranged according to the provided precision, and wherein the histogram tree data structure is precalculated to start with an empty exponential node, and a defined number of regular nested nodes that correlate to the provided precision;
computing information for each populated node in the histogram tree data structure, wherein the computed information includes one or more of sufficient statistics, metrics, or histogram information;
employing one or more of the computed information at populated nodes of the histogram tree data structure to respond to a query related to the sampled data sources; and
employing the histogram information to provide a visualization representing an estimate of probability distribution for numerical data of the one or more sampled data objects; and
a client computer, comprising:
a transceiver that communicates over the network;
a memory that stores at least instructions; and
one or more processors that execute instructions that perform actions, including:
providing the query.

12. The system of claim 11, wherein the one or more processors that execute instructions perform further actions, comprising:

adding a new data object to the histogram tree data structure, including:
sampling a new data object from the one or more data sources;
updating the computed information for one or more previously populated nodes in the histogram tree data structure that correspond to one or more values of the new data object based on the provided precision; and
generating one or more new nodes in the histogram tree data structure for one or more new values of the new data object that are non-represented in the one or more previously populated nodes based on the provided precision, wherein computed information is provided for each new node in the histogram tree data structure.

13. The system of claim 11, wherein the one or more processors that execute instructions perform further actions, comprising:
generating a new histogram tree data structure based on merging the histogram tree data structure with another histogram tree data structure that also stores sampled data objects from the one or more data sources, including:
creating a new precision for a number of significant figures for each value to be stored for each sampled data object in the new histogram tree data structure based on a greater of the precision of the histogram tree data structure and another precision of the other histogram tree data structure;
adding equivalent prepopulated nodes from the histogram tree data structure and the other histogram tree data structure together, wherein computed information for the added together nodes is updated based on the new precision; and
adding non-equivalent prepopulated nodes to the new histogram tree data structure in a hierarchical arrangement based on the new precision.

14. The system of claim 11, wherein the one or more processors that execute instructions perform further actions, comprising:
generating the histogram tree data structure with zero values at each node based on the provided precision prior to sampling the data objects from the one or more data sources.

15. The system of claim 11, wherein the one or more data sources, further comprise one or more of databases, applications, services, file systems, spreadsheets, document management systems, local data streams, or remote data streams.

16. A network computer for data processing, comprising:
a transceiver that communicates over the network;
a memory that stores at least instructions; and
one or more processors that execute instructions that perform actions, including:
sampling a plurality of data objects from one or more data sources;
providing a precision for a number of significant figures for each value to be stored for each sampled data object;
in response to one or more of the sampled data objects having their number of significant figures greater than the provided precision, truncating the significant figures for the one or more data objects to match the provided precision;
employing a histogram tree data structure to store the value for each sampled data object, wherein a number of hierarchical levels for nodes in the tree data structure are arranged according to the provided precision, and wherein the histogram tree data structure is precalculated to start with an empty exponential node, and a defined number of regular nested nodes that correlate to the provided precision;
computing information for each populated node in the histogram tree data structure, wherein the computed information includes one or more of sufficient statistics, metrics, or histogram information;
employing one or more of the computed information at populated nodes of the histogram tree data structure to respond to a query related to the sampled data sources and
employing the histogram information to provide a visualization representing an estimate of probability distribution for numerical data of the one or more sampled data objects.

17. The network computer of claim 16, wherein the one or more processors that execute instructions perform further actions, comprising:
adding a new data object to the histogram tree data structure, including:
sampling a new data object from the one or more data sources;
updating the computed information for one or more previously populated nodes in the histogram tree data structure that correspond to one or more values of the new data object based on the provided precision; and
generating one or more new nodes in the histogram tree data structure for one or more new values of the new data object that are non-represented in the one or more previously populated nodes based on the provided precision, wherein computed information is provided for each new node in the histogram tree data structure.

18. The network computer of claim 16, wherein the one or more processors that execute instructions perform further actions, comprising:
generating a new histogram tree data structure based on merging the histogram tree data structure with another histogram tree data structure that also stores sampled data objects from the one or more data sources, including:
creating a new precision for a number of significant figures for each value to be stored for each sampled data object in the new histogram tree data structure based on a greater of the precision of the histogram tree data structure and another precision of the other histogram tree data structure;
adding equivalent prepopulated nodes from the histogram tree data structure and the other histogram tree data structure together, wherein computed information for the added together nodes is updated based on the new precision; and
adding non-equivalent prepopulated nodes to the new histogram tree data structure in a hierarchical arrangement based on the new precision.

19. The network computer of claim 16, wherein the one or more processors that execute instructions perform further actions, comprising:
generating the histogram tree data structure with zero values at each node based on the provided precision prior to sampling the data objects from the one or more data sources.

20. The network computer of claim 16, wherein the one or more data sources, further comprise one or more of databases, applications, services, file systems, spreadsheets, document management systems, local data streams, or remote data streams.

* * * * *